United States Patent
van Os

(10) Patent No.: US 7,149,928 B2
(45) Date of Patent: Dec. 12, 2006

(54) USER TRANSPARENT SOFTWARE MALFUNCTION DETECTION AND REPORTING

(75) Inventor: Ron van Os, Sunnyvale, CA (US)

(73) Assignee: Aladdin Knowledge Systems, Inc. (IL)

( * ) Notice: Subject to any disclaimer, the term of this patent is extended or adjusted under 35 U.S.C. 154(b) by 118 days.

(21) Appl. No.: 10/150,543

(22) Filed: May 17, 2002

(65) Prior Publication Data

US 2002/0162053 A1  Oct. 31, 2002

Related U.S. Application Data

(63) Continuation of application No. 09/265,839, filed on Mar. 10, 1999, now abandoned.

(51) Int. Cl.
*G06F 11/00* (2006.01)
(52) U.S. Cl. ...................................... 714/38
(58) Field of Classification Search .................. 714/38, 714/34–35, 39–40, 31, 45–46; 717/124–128, 717/167
See application file for complete search history.

(56) References Cited

U.S. PATENT DOCUMENTS

| | | | | |
|---|---|---|---|---|
| 5,623,663 A * | 4/1997 | Morgan et al. | ............. | 718/100 |
| 5,632,032 A * | 5/1997 | Ault et al. | .................. | 718/100 |
| 5,778,230 A * | 7/1998 | Wimble et al. | ............. | 717/131 |
| 5,784,613 A * | 7/1998 | Tamirisa | ...................... | 718/100 |
| 5,867,714 A * | 2/1999 | Todd et al. | .................. | 717/172 |
| 5,953,530 A * | 9/1999 | Rishi et al. | .................. | 717/127 |
| 6,026,362 A * | 2/2000 | Kim et al. | ...................... | 705/1 |
| 6,131,185 A * | 10/2000 | Coskun et al. | ............... | 717/129 |
| 6,263,456 B1 * | 7/2001 | Boxall et al. | .................. | 714/31 |
| 6,339,790 B1 * | 1/2002 | Inoue | ......................... | 709/224 |
| 6,378,124 B1 * | 4/2002 | Bates et al. | .................. | 717/129 |
| 6,571,290 B1 * | 5/2003 | Selgas et al. | ............... | 709/228 |
| 6,587,967 B1 * | 7/2003 | Bates et al. | .................... | 714/35 |
| 6,611,878 B1 * | 8/2003 | De Armas et al. | .......... | 719/328 |
| 2002/0029275 A1 * | 3/2002 | Selgas et al. | ............... | 709/227 |

* cited by examiner

*Primary Examiner*—Dieu-Minh Le
(74) *Attorney, Agent, or Firm*—Buchanan Ingersoll & Rooney LLP

(57) ABSTRACT

The present invention, generally speaking, "instruments" an arbitrary software program, without changing the software program, to automate malfunction detection and reporting. Although users can be invited to enter a description of what the user was doing prior to receiving the error, report generation and transmission to a remote server can be fully automatic and transparent to the user. In the case of beta testing, therefore, a software developer is guaranteed to receive all pertinent information about malfunctions of an application without having to rely on "fallible humans" for this information. The effectiveness of beta testing, in terms of ultimately contributing to an improved product, is therefore greatly increased. Various kinds of malfunctions may be detected and reported, including an application "crashing," becoming "hung," etc.

36 Claims, 4 Drawing Sheets

*CASHLOG EXAMPLE ***

06:02:02-11/16/1998, CLIENT START, CLIENTID=2054

....

...

....

06:08:12-11/16/1998, WM_COMMAND, CMD=15
06:09:10-11/16/1998, LOADMODULE, C:\WinNT\OFFICE\SPELL32.DLL @ 0xBF002323
06:10:07-11/16/1998, WM_COMMAND, CMD=17
06:10:07-11/16/1998, WM_COMMAND, CMD=22
06:10:08-11/16/1998, WM_COMMAND, CMD=17
06:10:12-11/16/1998, WM_COMMAND, CMD=27
06:11:07-11/16/1998, WM_COMMAND, CMD=1024
06:11:07-11/16/1998, WM_COMMAND, CMD=29
06:14:10-11/16/1998, UNLOADMODULE, SPELL32.DLL
06:17:52-11/16/1998, WM_COMMAND, CMD=1025
06:19:47-11/16/1998, WM_COMMAND, CMD=27
06:19:48-11/16/1998, WM_COMMAND, CMD=32107
06:19:49-11/16/1998, LOADMODULE, C:\WINNT\system32\MSIDLE.DLL
06:19:49-11/16/1998, EXCEPTION, 0xC0000005: Access Violation @ 0x5F45C5B5, MODULE: C:\WINNT\system32\MSVCRT.DLL
06:19:51-11/16/1998, CLIENT EXCEPTION LOG SAVED, CLIENTID=2054, TRANSID=90123, AGENTID=11300

*Fig. 2*

USER TRANSPARENT SOFTWARE MALFUNCTION DETECTION AND REPORTING

This application is a continuation of application Ser. No. 09/265,839, filed on Mar. 10, 1999 now abandoned.

BACKGROUND OF THE INVENTION

1. Field of the Invention

The present invention relates to software malfunction detection and reporting.

2. State of the Art

Software malfunction detection and reporting tools are known. One such tool is Microsoft's "Dr. Watson." Dr. Watson is a debugging tool designed to provide software programmers with detailed information on the internal state of the Windows operating system when a Unhandled Application Exception (UAE) occurs. Dr. Watson must be running at the time a UAE occurs to extract the internal information from the system.

Dr. Watson uses comparatively little memory and does not affect the performance of Windows. A software programmer therefore has no reason not to install Dr. Watson, especially if a UAE has occurred before. After Dr. Watson is installed, information is collected when a UAE occurs and written to a special file (DRWATSON.LOG) located in the Windows directory. In addition, a Dr. Watson dialog box will appear, prompting the user to enter a description of what the user was doing prior to receiving the error. A developer may choose to start Dr. Watson automatically each time Windows is started, thus allowing critical information to be collected each time a UAE occurs. After several UAEs have been logged, the log may, if desired, be sent to a remote location for diagnosis.

Dr. Watson is a diagnostic tool, not a cure for a problem. Having Dr. Watson will not prevent an error from occurring, but the information in DRWATSON.LOG often helps developers determine the cause of the error.

Another tool, the Microsoft Diagnostics (MSD) program, is designed to assist Microsoft customers and Product Support Services (PSS) technicians in solving problems with Microsoft products. MSD identifies system configuration information such as the BIOS, video card type and manufacturer, installed processor(s), I/O port status, operating system version, environment settings, hardware devices attached, and additional software running concurrently with MSD.

MSD is often used in conjunction with Dr. Watson to provide information on hardware configurations and UAEs. Error reports may be generated that include information from both the MSD program and Dr. Watson.

As may be appreciated from the foregoing description, existing software malfunction detection and reporting tools are targeted to software developers. Significant computer expertise and manual interaction is required in order to use these tools effectively. In particular, such tools are not well suited for beta users. Although beta users are supposed to report crashes and malfunctions, a beta user may experience a malfunction but, in the day-to-day rush of business, fail to report it. A need exists for a software failure and detection tool well suited for beta users such that a software developer can obtain malfunction reports and diagnostic information easily and reliably.

SUMMARY OF THE INVENTION

The present invention, generally speaking, "instruments" an arbitrary software program, without changing the software program, to automate malfunction detection and reporting. Although users can be invited to enter a description of what the user was doing prior to receiving the error, report generation and transmission to a remote server can be fully automatic and transparent to the user. In the case of beta testing, therefore, a software developer is guaranteed to receive all pertinent information about malfunctions of an application without having to rely on "fallible humans" for this information. The effectiveness of beta testing, in terms of ultimately contributing to an improved product, is therefore greatly increased. Various kinds of malfunctions may be detected and reported, including an application "crashing," becoming "hung," etc.

BRIEF DESCRIPTION OF THE DRAWING

The present invention may be further understood from the following description in conjunction with the appended drawing. In the drawing:

FIG. 2 is an example of a log created by the software agent of FIG. 1;

DETAILED DESCRIPTION OF THE PREFERRED EMBODIMENTS

Figure 1:
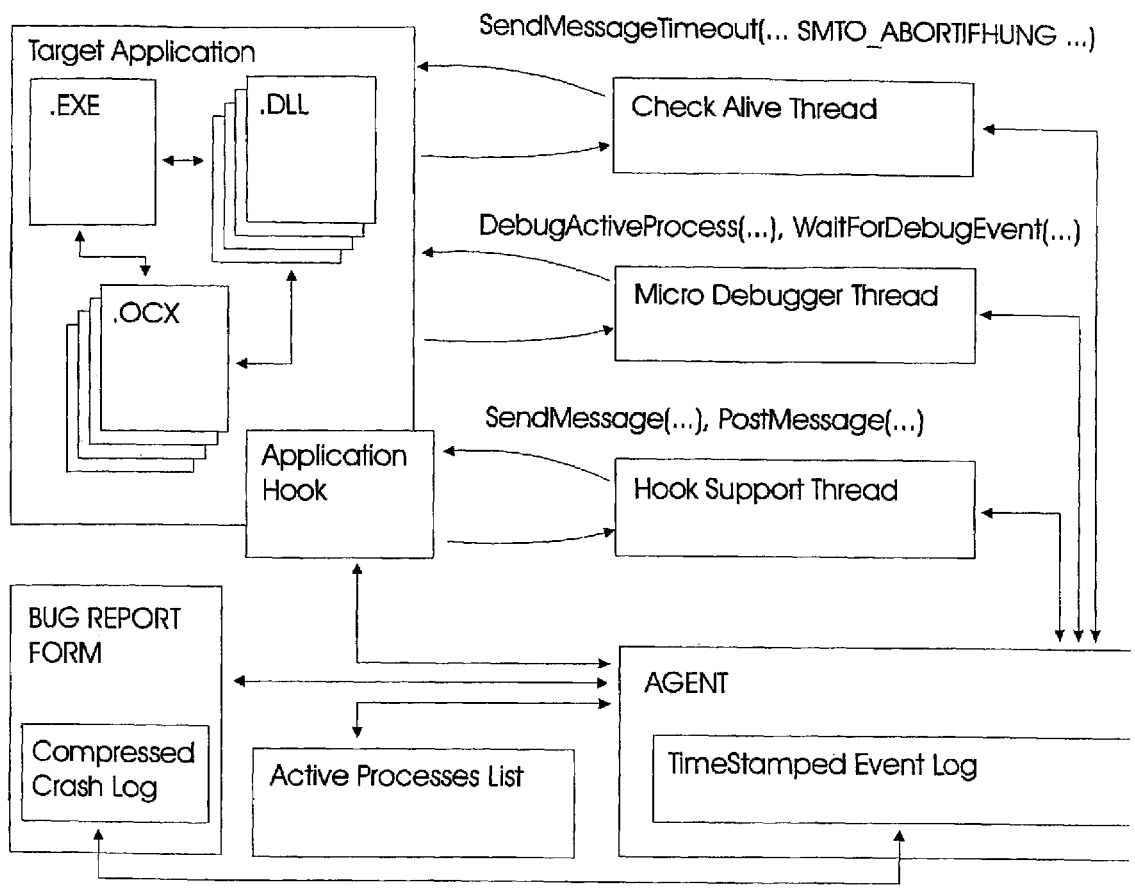
FIG. 1 is a block diagram of a software malfunction detection and reporting system in accordance with an exemplary embodiment of the invention.

Referring now to FIG. 1, a block diagram is shown of an automated malfunction detection and reporting system in accordance with an exemplary embodiment of the present invention. Communication of a malfunction report may be accomplished in any of various different ways, for example via a LAN connection, with data collection occurring inside a corporation, via the Internet, of simply by means of the generation of an ASCII report which is then inserted into an email outbox. In accordance with one advantageous embodiment, to be presently described, a user machine is assumed to have installed software realizing a "polite agent" that communicates messages of abbreviated length with a remote server using a "virtual connection," e.g., an "opportunistic" Internet connection. Such a polite agent is described in U.S. application Ser. No. 09/138,403 filed Mar. 10, 1999, incorporated herein by reference. The polite agent technology described in published International Patent Application WO 97/07656, also incorporated herein by reference, may also be used with the present invention.

The agent is provided with a list of active processes, or "target applications, with which the agent is to interact, e.g., to perform automated malfunction detection and reporting. One such target application is shown in FIG. 1. As illustrated, a target application will typically include a main body of executable code (.EXE), various Dynamic Link Libraries (.DLL), various Custom Control and COM objects (.OCX), etc. The terms EXE, DLL, OCX, etc., are specific to the Window operating system. In the case of other operating systems, other terminology is applied to similar concepts. The invention may be applied in connection with any operating system.

When a process is started on the user machine, the agent "hooks" (installs code realizing an application hook for) that process. The application hook then identifies the process either as a process of interest, i.e., one of the agent's active processes, or as a process not of interest. In the latter case, the application hook removes itself. The function of the application hook is to intercept and filter messages from the target application and communicate messages of interest to the agent, which maintains a timestamped event log. The application hook and the agent communicate through a hook support thread using operating system messaging facilities, e.g., in the case of the Windows operating system, Send-Message( . . . ) and PostMessage( . . . ). For purposes of malfunction detection and reporting, messages of interest include menu selections, loading of a DLL, etc. These events are timestamped by the agent and entered into the event log.

Note that multiple target application may be active at the same time, in which case each target application would have its own application hook, hook support thread and timestamped event log.

The application hook allows relatively high-level activity information concerning the target application to be captured. Such activity information is readily intelligible to the average software programmer, in contrast to the much more arcane information gathered by known malfunction detection and reporting tools, such as stack frames, pointers, etc.

In addition to the application hook, two addition threads are created on a per-application basis, a Micro Debugger thread and a Check Alive thread.

The Micro Debugger thread is registered with the operating system as the debugger for the target application using the appropriate operating system call, e.g., DebugActiveProcess( . . . ). This call waits until an exception occurs in the target application and then returns control to the Micro Debugger. The target application therefore runs under the control of the Micro Debugger. The Micro Debugger is notified by the operating system when a "crash" (UAE) occurs. The Micro Debugger communicates this information to the agent, performs cleanup for the target application, and terminates the target application. The agent then solicits additional information from the user concerning the malfunction.

Check Alive is an optional feature that may be specified when the instruction to monitor a particular application is given. The purpose of the Check Alive thread is to detect when the target application has hung, i.e., become non-responsive to user input. The Check Alive performs this function by repeatedly "pinging" the target application, i.e., send a message to the target application to see if the target application responds. A timeout period is set for the message such that if the target application does not respond within the timeout period, control is returned to the Check Alive thread. If Check Alive thread detects that the application is hung, it notifies the agent, which then solicits confirmation and additional information from the user.

After the target application has either crashed or becomes hung, the agent assembles and (optionally) compresses the "crash log" as part of a bug report form and schedules the bug report form for automatic upload to the server using "polite connection" methods or some other connection. An example of a crash log is shown in FIG. 2.

Figure 3:
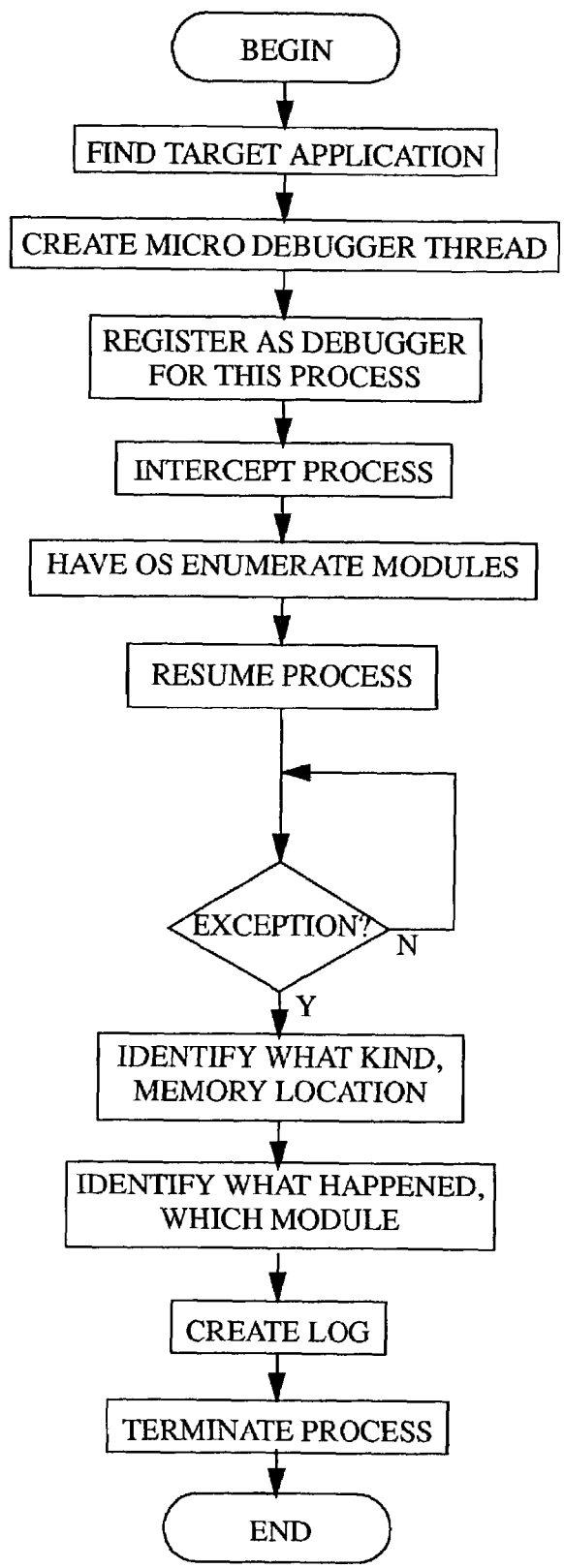
FIG. 3 is a flow chart illustrating operation of the Micro Debugger thread of FIG. 1.

Referring now to FIG. 3, operation of the Micro Debugger thread will be described in greater detail. Once an application hook has found a target application, a Micro Debugger thread is created for that target application and registered with the operation system as the debugger for the target application process. The Micro Debugger then causes execution of the process to be then interrupted while the operating system enumerates modules that the process has loaded. In the case of the Windows operating system, the operating system identifies each module loaded by the target application thread along with the memory location of that module. When all of the modules have been enumerated, this information is sent to the agent to be logged, and the target application process is allowed to continue running. Any modules loaded or unloaded thereafter will be detected by the Micro Debugger and logged as described previously.

When an exception occurs, the operating system calls the Micro Debugger, which determines what kind of exception has occurred and where in memory the exception occurred. The Micro Debugger also captures additional context of the exception, e.g., what happened (divide by zero, access violation, etc.) and in which module. The Micro Debugger then sends this information to the agent to be stored in the event log. Finally, the Micro Debugger terminates the target application. Optionally, prior to terminating the target application, the Micro Debugger may perform cleanup for the target application. In order to do so, the Micro Debugger will typically require some detailed knowledge of the target application. Given such knowledge, the Micro Debugger could, for example, save a user's work prior to terminating the target application such that the user's work is not lost.

Figure 4:
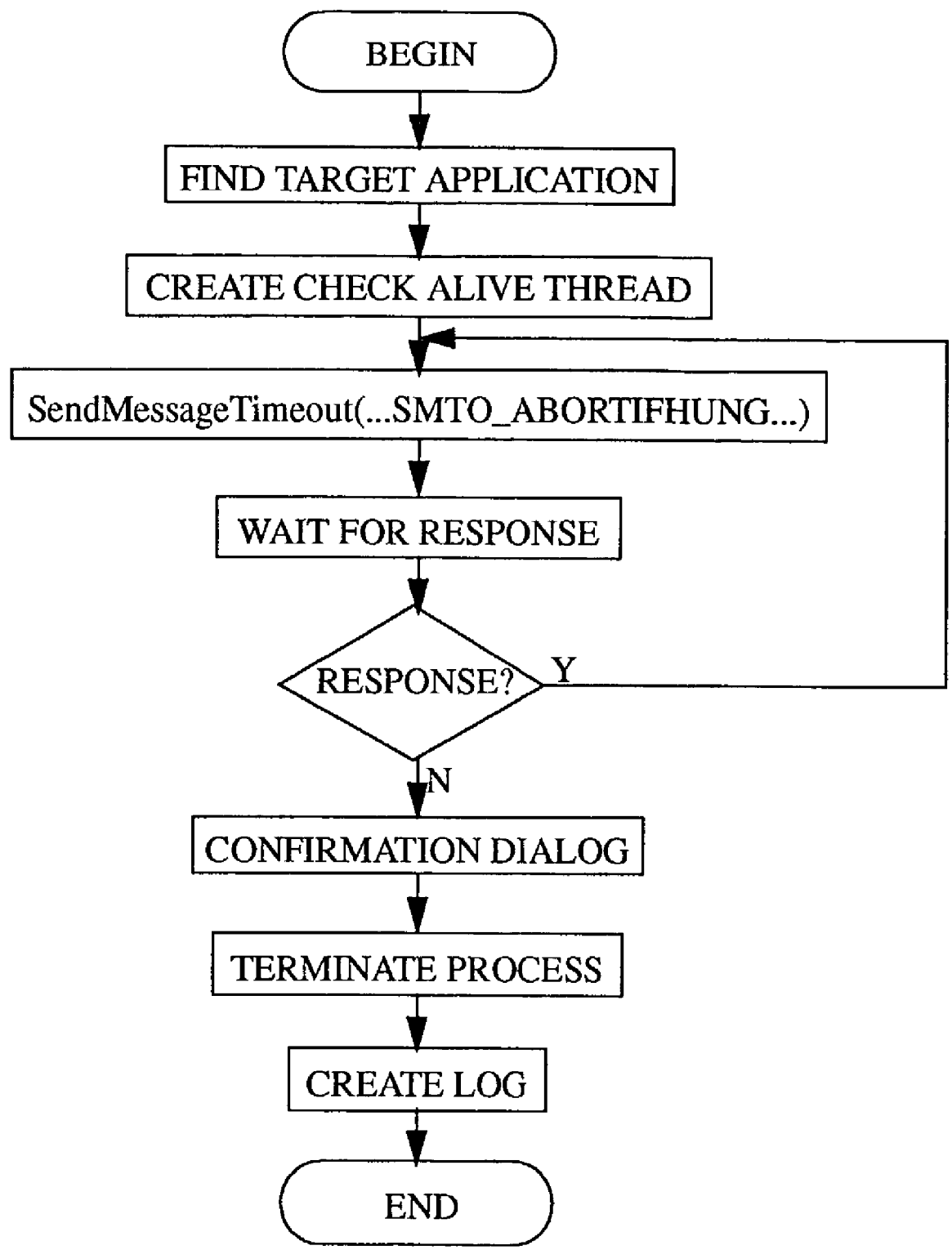
FIG. 4 is a flow chart illustrating operation of the Check Alive thread of FIG. 1.

Referring to FIG. 4, operation of the Check Alive thread will be described in greater detail. Once an application hook has found a target application, a Check Alive thread is created for that target application. The Check Alive thread then enters a loop in which the following actions are performed. The Check Alive thread sends a message with timeout to the target application. The timeout period may be, for example, 5 seconds. The Check Alive thread then waits for a response from the target application. If a response is received within the timeout period, the Check Alive thread waits for a period of time (e.g., about 15 seconds) before sending another message with timeout. This manner of operations continues for so long as the target application is running and responsive.

If a response is not received from the target application within the timeout period, either the Check Alive thread or the agent attaches a dialog box to the application window asking the user to confirm that the target application has hung. If the user concurs, then the process is terminated. The agent then creates a crash log and schedules it for upload to the server as described previously.

Automatically collecting malfunction information on the server without the need for user intervention greatly facilitates the job of a software developer to find and fix program bugs. A beta test coordinator, for example, may remotely log onto the server and view malfunction information. The beta test coordinator may find, for example, that of 200 installed copies of a program, five copies have crashed within a week's time. Based on this information—the reliability of which is assured—priorities may then be set to resolve the problem.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method for debugging a software application, during executing said software application under an operating system, comprising:
   a) Providing a software agent for intercepting messages transferred between said software application and said operating system; and executing said software agent under said operating system;
   b) Intercepting messages transferred between said software application and said operating system by said agent, and, optionally, storing the description of said messages and their timestamp in a storage media;
   c) creating by said agent a Check Alive, being a thread for said application;
   d) sending by said Check Alive thread messages comprising a request for response to said application; and, thereby
   e) upon not receiving a response to said message within a timeout period, indicating a hang-out of said application.

2. A method according to claim 1, further comprising providing a remote server accessible by said agent; sending the content of said storage media to said remote server; and optionally cleaning up said storage media from its information.

3. A method according to claim 1, further comprising providing a remote server accessible by said agent; sending the content of said storage media to said remote server; and optionally cleaning up said storage media from its information.

4. A method according to claim 2 or 3, wherein said server is used by a software developer to gather malfunction information concerning a pre-release version of a product of the software developer.

5. A method according to claim 1,2, or 3, further comprising selectively monitoring said software application.

6. A method according to claim 5, wherein said selectively monitoring comprises: inserting a hook into a thread of said software application as its execution begins; using said hook to determine an identifier of said thread; and comparing said identifier to a list of threads belonging to said software application.

7. A method according to claim 6, further comprising, depending on results of said comparing operation, either removing said hook or allowing said hook to remain.

8. A method according to claim 6, further comprising using said hook for tracking user activity within said application; and storing description of the activity of the user of said application within the details regarding said exception.

9. A method according to claim 8, wherein said description includes information concerning the interface commands activated by said user, and/or the time of activation.

10. A method according to claim 5, further comprising, for an execution thread belonging to said software application, creating a control thread and registering said control thread as a debugger for the execution thread.

11. A method according to claim 10, wherein said control thread receives an unhandled exception message of said application and, in response, captures the execution context of the execution thread.

12. A method according to claim 11, wherein said control thread in response to said un-handled application exception message, terminates said execution thread.

13. A method according to claim 12, wherein said control thread, prior to terminating said execution thread, performs cleanup for said execution thread.

14. A method according to claim 6, further comprising, for an execution thread belonging to a software application, creating a responsiveness monitoring thread.

15. A method according to claim 14, wherein said responsiveness monitoring thread periodically sends messages to said execution thread.

16. A method according to claim 15, wherein the messages have timeout period specified.

17. A method according to claim 16, wherein said responsiveness monitoring thread, if it does not receive a reply from said execution thread within the timeout period, performs at least one of the following actions: displays to a user a dialog within a user interface space of said execution thread asking the user to confirm that the application has hung; captures the execution context of said execution thread; performs cleanup for said execution thread; and terminates said execution thread.

18. A method according to claim 17, wherein, if said user confirms that said application has hung, said responsiveness monitoring thread terminates said execution thread.

19. A method according to claim 1, wherein the method is carried out without modifying said application.

20. A method according to claim 1, wherein said messages are selected from the group consisting of a menu selection, and loading of a DLL.

21. A method according to claim 1, wherein said intercepted messages are transferred between said software application and said operating system using operating system messaging facilities.

22. A method for debugging a software application, during executing said software application under an operating system, comprising:
   a) providing a software agent for hooking processes being executed under said operating system, and executing said software agent under said operating system;
   b) on starting a new process thread of said application(s), hooking by said agent said process thread and creating detection thread(s) for automatically detecting events and malfunction of said process thread;
   c) upon detecting a malfunction by one of said detection thread(s), logging the description of said malfunction;
   d) presenting a log to a user, and/or sending said log to a remote server; and
   e) optionally, terminating the execution of said application.

23. A system for debugging a software application, during executing said software application under an operating system on a user's computer, said system comprising:
   storage means within said user's computer for temporarily storing information regarding the normal operation and malfunction of said application in said user's machine;
   a software agent, being executed under said operating system for intercepting messages transferred between said application and said operating system, thereby obtaining information regarding the normal operation of said application;
   for creating a Micro Debugger, being a thread for said agent to be registered as the debugger of the process of said application, thereby intercepting exceptions during executing said application;
   for sending the obtained information regarding a normal operation and exception of said application to a remote server;
   a remote server, for gathering information regarding the execution and exception of said application in said user's machine.

24. A method for debugging a software application, during executing said software application under an operating system, comprising:
  a) Providing a software agent for intercepting messages transferred between said software application and said operating system; and executing said software agent under said operating system;
  b) Intercepting messages transferred between said software application and said operating system by said agent, and, optionally, storing the description of said messages and their timestamp in a storage media; and
  c) creating by said agent a Micro Debugger, being a thread for said application, and registering said Micro Debugger as the debugger of the process of said application; and upon occurring an exception in said application:
    i. calling said Micro Debugger thread by said operating system as being the debugger of said application, thereby obtaining details regarding said exception;
    ii. sending said details by said Micro Debugger thread to said agent, and storing said details within a storage media; and
    iii. optionally, performing cleanup for said application;
  d) optionally, terminating the executing of said application.

25. A method according to claim 24, further comprising:
  a) creating by said agent a Check Alive, being a thread for said application;
  b) sending by said Check Alive thread messages comprising a request for response to said application; and
  c) upon not receiving a response to said message within a timeout period, indicating a hang-out of said application.

26. A method according to claim 25, wherein the method is carried out without modifying said application.

27. A method according to claim 25, wherein said messages are selected from the group consisting of a menu selection, and loading of a DLL.

28. A method according to claim 25, wherein said intercepted messages are transferred between said software application and said operating system using operating system messaging facilities.

29. A method according to claim 25, further comprising selectively monitoring said software application.

30. A method according to claim 24, wherein the method is carried out without modifying said application.

31. A method according to claim 24, wherein said messages are selected from the group consisting of a menu selection, and loading of a DLL.

32. A method according to claim 24, wherein said intercepted messages are transferred between said software application and said operating system using operating system messaging facilities.

33. A method according to claim 24, further comprising selectively monitoring said software application.

34. A method for debugging a software application, during executing said software application under an operating system, comprising:
  intercepting messages transferred between said software application and said operating system;
  storing the description of said messages and their timestamp in a storage media;
  creating a Micro Debugger, being a thread for said application;
  registering said Micro Debugger as the debugger of the process of said application; and
  upon occurring an exception in said application:
    calling said Micro Debugger thread by said operating system as being the debugger of said application; and
    obtaining details regarding said exception.

35. A method according to claim 34, further comprising:
  a) creating a Check Alive thread;
  b) sending by said Check Alive thread a message comprising a request for response and a timeout value by said Check Alive thread to said application; and
  c) upon not receiving a response to said message within a timeout period, indicating a hang-out of said application.

36. A method according to claim 35, wherein upon not receiving a response to said message within a timeout period, indicating a hang-out of said application, further comprising creating a crash log and scheduling it for uploading to a server.

* * * * *